US010225160B1

(12) United States Patent
Polinati et al.

(10) Patent No.: US 10,225,160 B1
(45) Date of Patent: Mar. 5, 2019

(54) DEFINING AND ENFORCING OPERATIONAL ASSOCIATIONS BETWEEN CONFIGURATION ITEM CLASSES IN MANAGED NETWORKS

(71) Applicant: ServiceNow, Inc., Santa Clara, CA (US)

(72) Inventors: Chinna Babu Polinati, Snoqualmie, WA (US); Madhavi Puvvada, Sammamish, WA (US); Viral Shah, Bothell, WA (US); M Kurukulasuriya P Rukshan Felix Perera, Bothell, WA (US)

(73) Assignee: SERVICENOW, INC., Santa Clara, CA (US)

( * ) Notice: Subject to any disclaimer, the term of this patent is extended or adjusted under 35 U.S.C. 154(b) by 0 days.

(21) Appl. No.: 15/907,049

(22) Filed: Feb. 27, 2018

(51) Int. Cl.
G06F 15/177 (2006.01)
H04L 12/24 (2006.01)
G06F 17/30 (2006.01)
G06F 3/0482 (2013.01)

(52) U.S. Cl.
CPC ............ H04L 41/22 (2013.01); G06F 3/0482 (2013.01); G06F 17/30598 (2013.01); G06F 17/30604 (2013.01); H04L 41/0803 (2013.01); H04L 41/12 (2013.01)

(58) Field of Classification Search
CPC ..... H04L 41/22; H04L 41/0803; H04L 41/12; G06F 3/0482; G06F 17/30598; G06F 17/30604
See application file for complete search history.

(56) References Cited

U.S. PATENT DOCUMENTS

| 6,895,586 | B1 | 5/2005 | Brasher | |
| 7,912,813 | B2 | 3/2011 | Rajaraman et al. | |
| 8,171,344 | B2* | 5/2012 | Watanabe | G06F 11/2257 714/26 |
| 9,069,749 | B1* | 6/2015 | Rumsby | G06F 11/261 |
| 2011/0112973 | A1 | 5/2011 | Sanghvi | |
| 2013/0250779 | A1* | 9/2013 | Meloche | H04L 41/5067 370/248 |
| 2016/0149985 | A1* | 5/2016 | Meloche | H04L 41/5032 370/329 |
| 2017/0026401 | A1* | 1/2017 | Polyakov | H04L 63/1433 |

* cited by examiner

Primary Examiner — Tauqir Hussain
(74) Attorney, Agent, or Firm — Fletcher Yoder PC

(57) ABSTRACT

A remote network management platform may include a database containing representations of configuration items associated with a managed network that is managed by the remote network management platform. The remote network management platform may further include a server device. The server device may be configured to obtain a plurality of preferred relationships for a particular configuration item class. The server device may be further configured to store, in the database, the plurality of preferred relationships. The server device may also be configured to visually provide indications of one or more respective pairings of relationship types and target configuration item classes from a plurality of preferred relationships, receive a selection of a particular relationship type and a particular target configuration item class in accordance with one of the indications, and store, in the database, the particular configuration item with the particular relationship type and the particular target configuration item class.

20 Claims, 14 Drawing Sheets

US 10,225,160 B1

DEFINING AND ENFORCING OPERATIONAL ASSOCIATIONS BETWEEN CONFIGURATION ITEM CLASSES IN MANAGED NETWORKS

BACKGROUND

A managed network may use tens, hundreds, or thousands of individual computing devices to facilitate interrelated or standalone operations. A configuration management database (CMDB) may include configuration items associated with these devices. That is, the configuration management database may include representations of the computing devices, the software applications installed on the computing devices, relationships therebetween, and configurations thereof. In turn, relationships may define operational associations between the configuration items. Such relationships might be used by the managed network to more efficiently carry out information technology service management, information technology operations management, configuration management, and other operations by providing insight into operational characteristics of the managed network. Thus, inaccuracies in relationships may negatively affect the efficacy with which these operations are performed.

SUMMARY

The embodiments herein relate to creating preferred relationships for configuration item classes in a managed network. A client device associated with the managed network may interact with a relationship governance tool that facilitates the creation of such preferred relationships for particular configuration item classes. This tool may be web-based and provide graphical user interfaces that guide the user when creating the preferred relationships and serve to enforce the preferred relationships when new relationships are defined for individual configuration items or subclasses of the particular configuration item classes. Advantageously, the preferred relationships allow for new relationships to be created more rapidly and accurately.

Accordingly, a first example embodiment may involve a remote network management platform. The remote network management platform may include a database containing representations of configuration items associated with a managed network that is managed by the remote network management platform. The configuration items may relate to computing devices and software applications disposed within the managed network. Each configuration item may be a member of a configuration item class, and configuration item classes may include respective sets of configuration items that share common attributes. The remote network management platform may further include a server device. The server device may be configured to obtain a plurality of preferred relationships for a particular configuration item class, where the preferred relationships define respective pairings of relationship types and target configuration item classes, and where the relationship types define operational associations between the particular configuration item class and the respective target configuration item classes. The server device may also be configured to store, in the database, the plurality of preferred relationships as being associated with the particular configuration item class. The server device may further be configured to, during definition or editing of a particular configuration item of the particular configuration item class, (i) visually provide indications of one or more of the respective pairings of relationship types and target configuration item classes from the plurality of preferred relationships, (ii) receive a selection of a particular relationship type and a particular target configuration item class in accordance with one of the indications, and (iii) store, in the database, the particular configuration item with the particular relationship type and the particular target configuration item class as a relationship for the particular configuration item.

In a second example embodiment, a method may include operations in accordance with the first example embodiment.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

In a fifth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
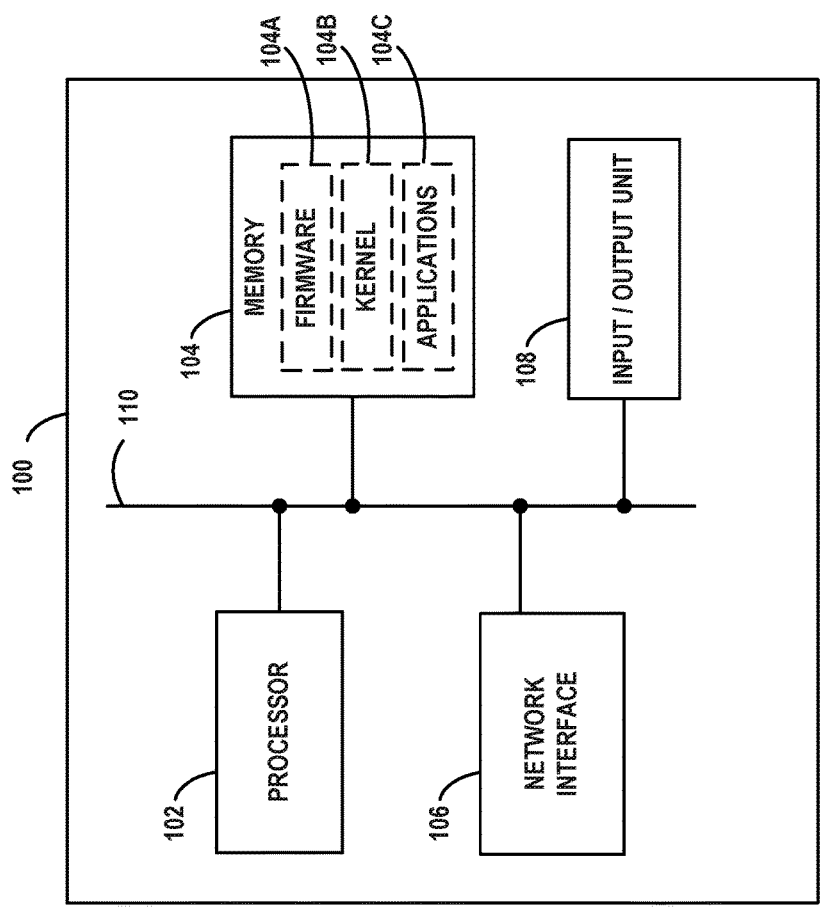
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
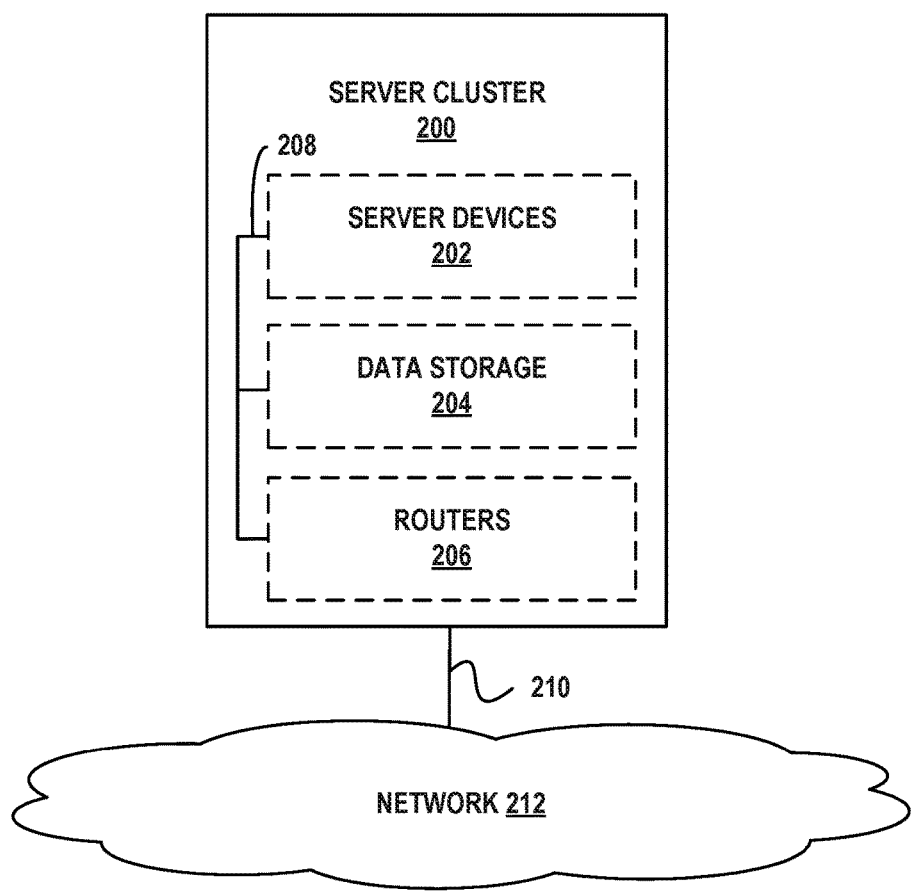
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
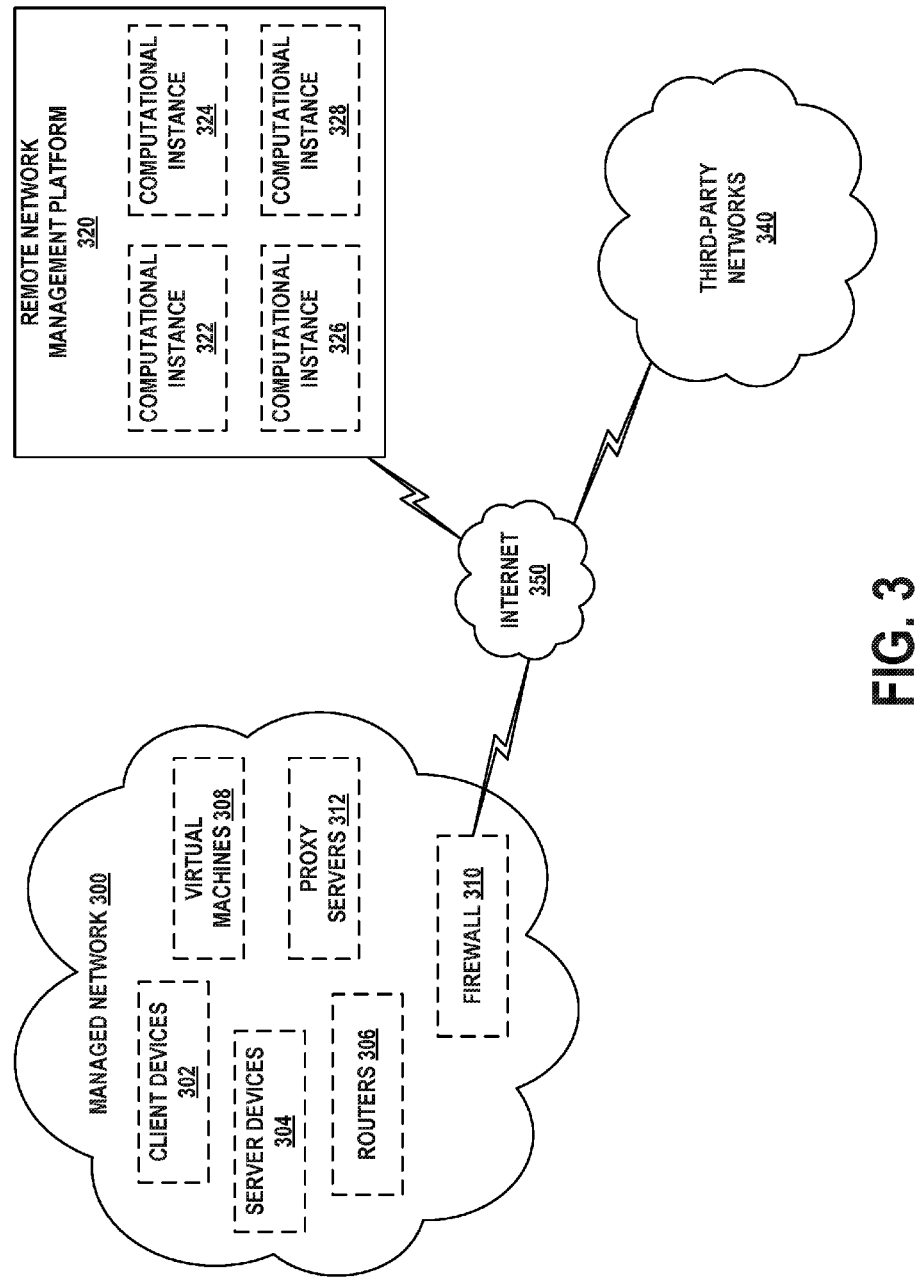
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
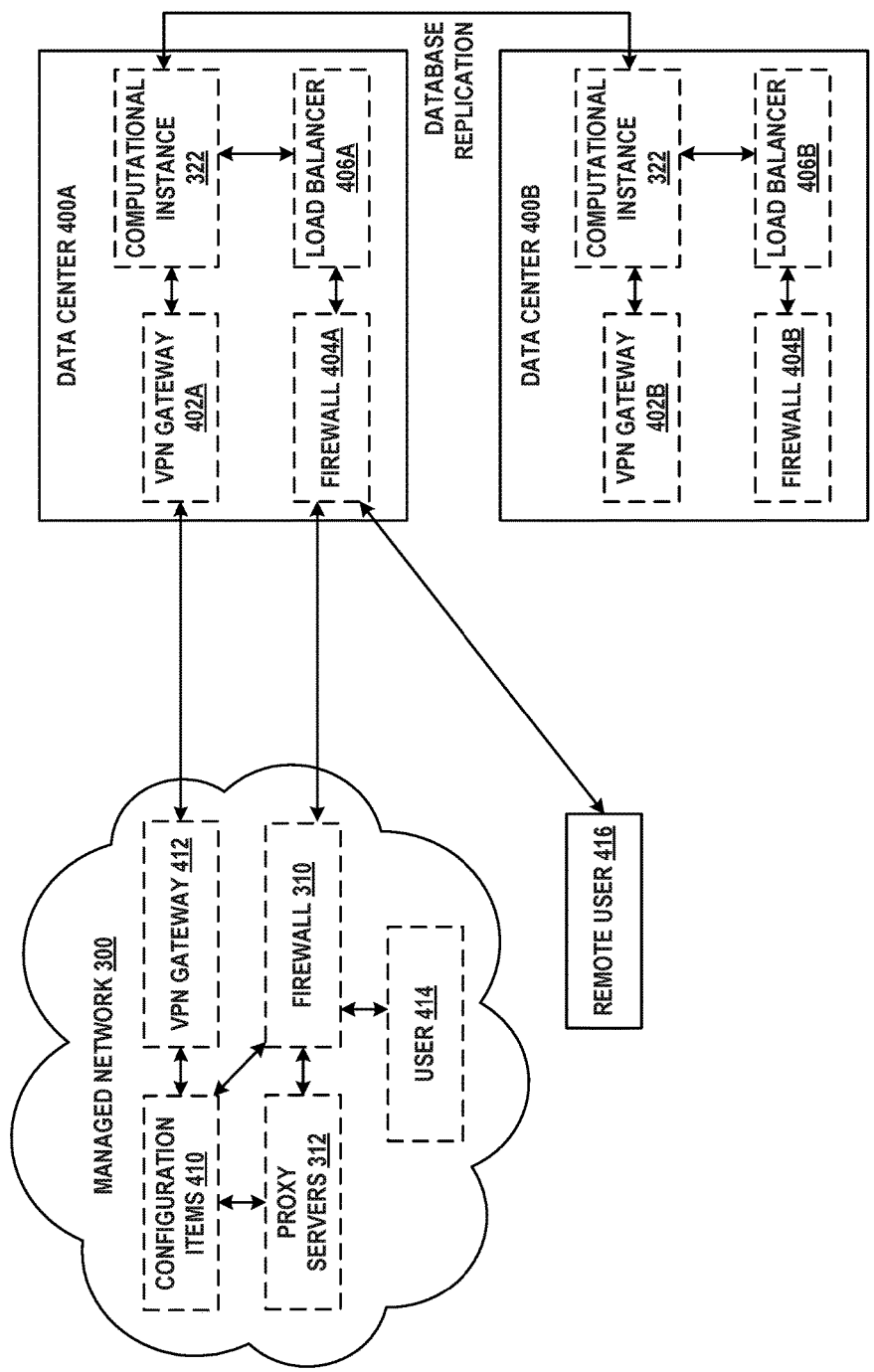
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
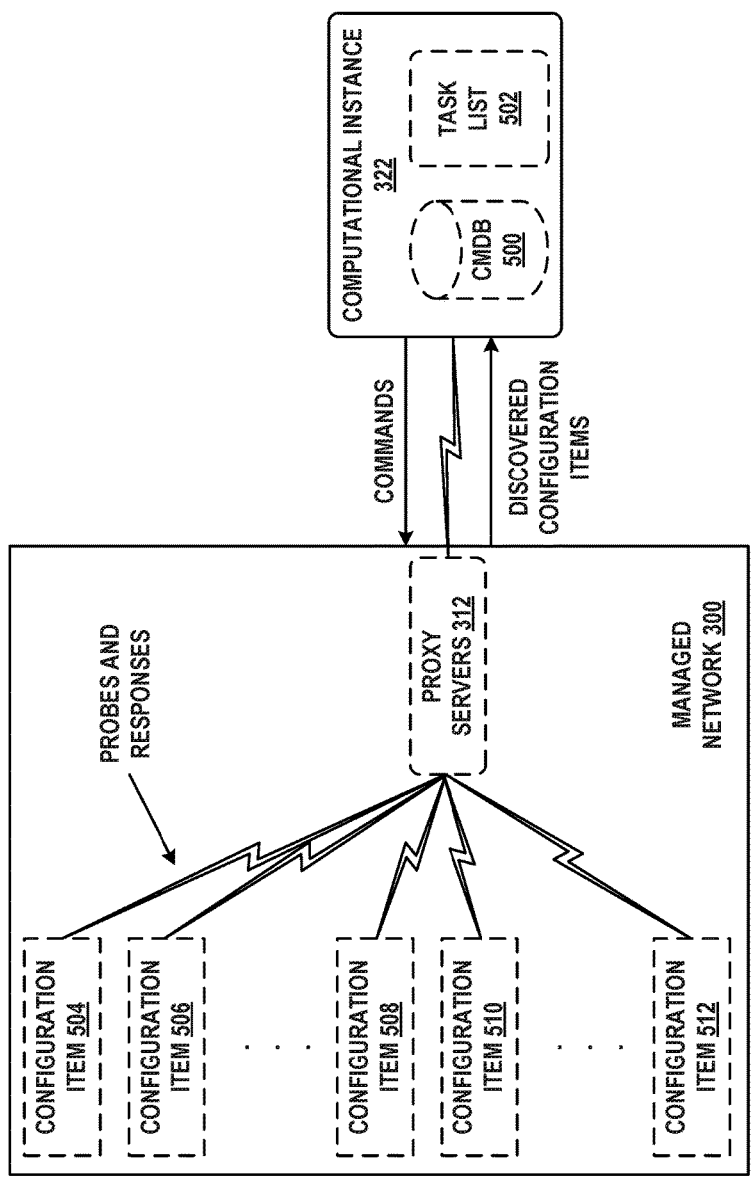
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500.

For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
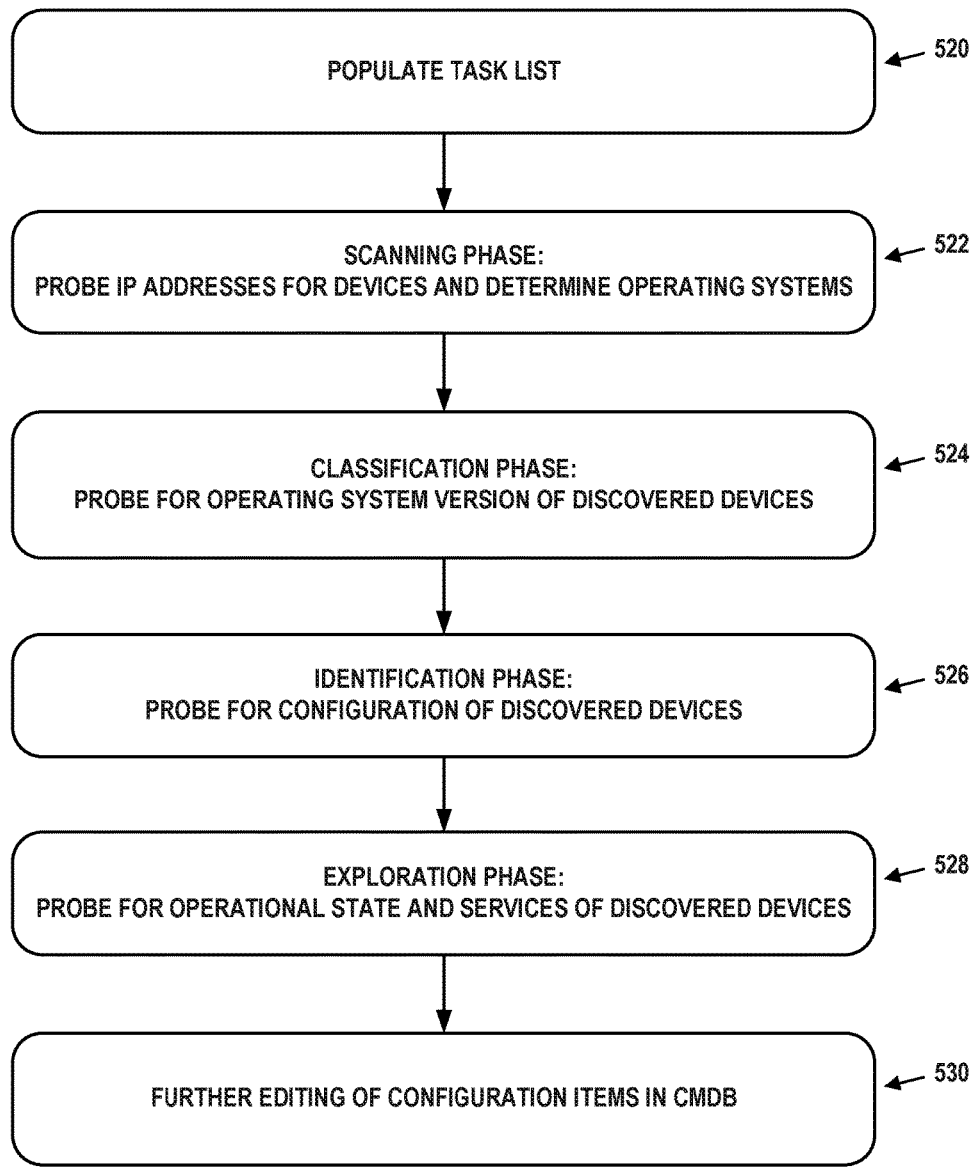
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE RELATIONSHIP GOVERNANCE TOOL

As described above, configuration items associated with a managed network may include any or all of client devices, server devices, routers, virtual machines, any applications or services running thereon, as well as relationships between these devices, applications, and services. A managed network may include hundreds or thousands of such configuration items. Relationships may define operational associations between the devices, application, and services. Accordingly, recording relationships may serve to provide an accurate representation of assets of the managed network and how those assets interact, and detail whether such assets can be rearranged, added to, retired, removed, repurposed, or the like. Relationships may thus serve to facilitate information technology service management, information technology operations management, configuration management, and other operations of the managed network. In contrast, inaccurate, insufficient, or overzealous use of relationships may detract from the efficacy with which such operations are performed.

Automated processes, such as discovery, can create or alter relationships, and different users within an enterprise can access and alter relationships. Accordingly, the CMDB, over time, may include many representations that are redundant, inaccurate, or conflicting. As noted above, inaccurate or conflicting relationships may cause inefficiencies in operating aspects of the enterprise.

To resolve these issues, a server device associated with the remote network management platform (e.g., disposed within a computational instance dedicated to the managed network) may provide visual indications that allow for specification of preferred relationships in the managed network. These preferred relationships, if followed, facilitate accurate and consistent use of configuration items in the CMDB. For example, for a particular configuration item class, a user can select, by way of data entry fields in a GUI provided by the server device, pairings of relationship types and target configuration item classes to create preferred relationships for the particular class. Once the preferred relationships are set, users may be presented with the preferred relationships when manually editing relationships for configuration items of the particular class.

Example embodiments follow that describe how preferred relationships can be created, and how use of the preferred relationships can be suggested or enforced to facilitate efficient operations in the managed network.

Figure 6A:
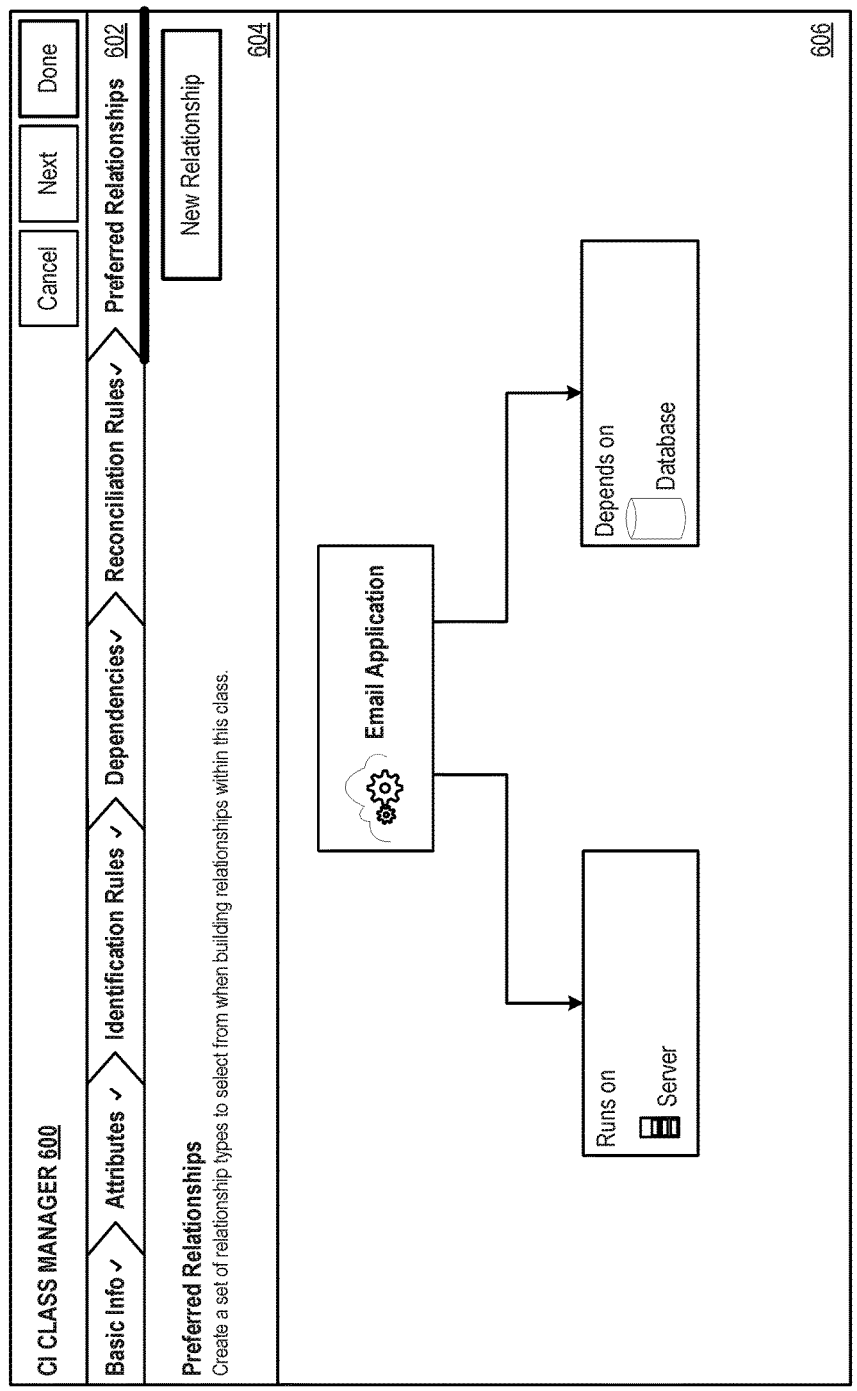
FIGS. 6A, 6B, and 6C depict a graphical user interface, in accordance with example embodiments.

FIG. 6A depicts a GUI 600, according to example embodiments. GUI 600 includes a preferred relationships pane 602, a new relationship option 604, and a relationships display 606. A server device may provide, to a client device by way of GUI 600, referred relationships pane 602 as part of a sequence of panes that are used to define a new class of configuration item. In the present example, an "Email Application" class is being defined.

As depicted in FIG. 6A, defining a configuration item class using the sequence of panes can involve defining attributes associated with the class from an "attributes" pane, defining one or more identification rules for determining configuration items that fall within the class from an "identification rules" pane, defining one or more dependencies that specify a parent-child association between the class and another configuration item class from a "dependencies" pane, defining one or more reconciliation rules that set a priority between two or more authoritative devices used for discovery of configuration items that fall within the class from a "reconciliation rules" pane, and defining and one or more preferred relationship between the class and another target class from preferred relationships pane 602. Accordingly, the one or more preferred relationships may be a part of a definition of a class that includes relevant information for the class.

Though GUI 600 is depicted as including preferred relationships pane 602 as part of a sequence of panes, in other examples a user can navigate to new relationship option 604 and relationships display 606 directly, for example after the configuration item class has already been created.

New relationship option 604 may allow a user to add a preferred relationship for a particular class of configuration item. In the present example, the particular class is an "Email Application" class. In turn, relationships display 606 may provide a visual indication of relationships that have already been set for the particular class, in this case an "Email Application" class. The "Email Application" class has a set of two relationships, each having a pairing of a relationship type and a target configuration item class. A first relationship in relationships display 606 includes a "runs on" relationship type and targets a "server" configuration item class. Accordingly, the first relationship specifies that configuration items of the "Email Application" class are software executed on a server. A second relationship includes a "depends on" relationship type and targets a "database" configuration item class. Accordingly, the second relationship specifies that configuration items of the "Email Application" class rely on a database to operate. A user may select new relationship option 604 to add to the set of relationships. Selection of relationship option 604 may cause the server device to provide additional options and data entry fields by way of GUI 600, as depicted in FIG. 6B.

Figure 6B:
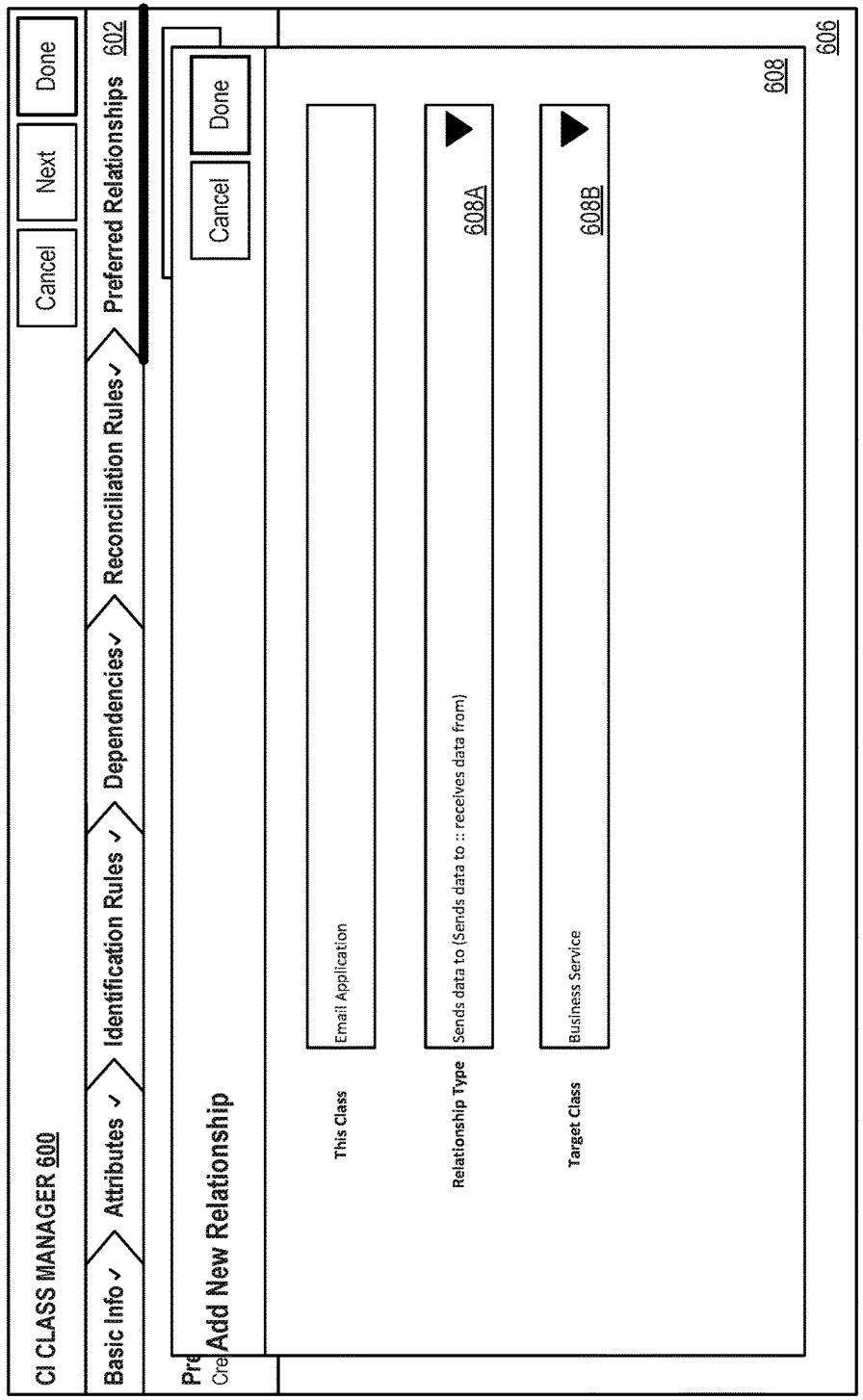

FIG. 6B depicts a new relationship menu 608 that is displayed via GUI 600. New relationship menu 608 includes an indication of the particular configuration item class, in this case the "Email Application" class, and a pairing of a candidate representation type and a candidate target configuration item class. The representation type generally refers to an operational association between the particular class and the target class. In the present example, the relationship type indicates that email applications of the particular class send data to a business service class.

Other relationship types may be possible as well. Some such relationship types include a "runs on" relationship type that indicates that a particular class is software executed on configuration items of the target class. An "allocated to" relationship type indicates that a particular class has been set aside for use by the target class. A "hosted on" relationship type indicates that a particular class is available from the remote target class. A "contains" relationship type indicates that a particular class stores or includes configuration items of the target class. A "cluster of" relationship type indicates that a particular class is a grouping of a computing device-related target class. A "depends on" relationship type indicates that a particular relationship uses the target class. A "controller for" relationship type indicates that a particular class controls the target class. These are just some of many relationship types that can be added to a particular class before or during discovery. Custom relationship types can be also be created.

New relationship menu 608 includes a pair of drop-down boxes 608A and 608B that respectively correspond to the candidate relationship type and the candidate target class. Selectable options in the drop-down boxes may be tailored based on the particular configuration item class. In particular, the server device may cause the drop-down box corresponding to a candidate relationship type to only provide data entry fields for relationship types that are valid for the particular class. For example, the relationship type drop-down box 608A in new relationship menu 608 may include an option to select a "runs on" relationship type, which is valid for an email application because it includes software instructions that are executable by a computing device. However, the drop-down box might not include an option to select a "cluster of" relationship type because an email application is not a cluster of servers or computing devices.

The server device may also limit which candidate target classes are available for selection based on the particular class. For example, an email application might not interact at all with certain other application classes in a managed network, so such classes might not be selectable from the drop-down box corresponding to the candidate target class. Conversely, an email application may interact with server devices in the managed network, so a "server" class may be selectable from the corresponding drop-down box.

Similarly, the server device may limit candidate relationship types that are selectable from drop-down box 608A based on a candidate target class, such as the "Business Service" class selected in target class drop-down box 608B. For instance, an email application might not "run on" a business service, but it may "send data to" a business service, as depicted in new application menu 608. Likewise, the server device may limit candidate classes that are selectable from drop-down box 608B based on a candidate relationship type, such as the "sends data to" relationship type selected in relationship type drop-down box 608A. For instance, an email application might not "run on" another application class, but it may "run on" devices of a server class.

The server device may also restrict access to new application menu 608 under certain circumstances. For example, in order to ensure that preferred relationships are trustworthy, privileges may be assigned within the managed network that determine whether or not a user can set preferred relationships for the particular class. Such permissions may be on a class-by-class basis. For example, a user might not have access to core classes that contain large numbers of configuration items, but might have access to preferred relationships of ancillary classes. Accordingly, the server device may determine whether a client device that receives GUI 600 is associated with a user who has been granted a privilege to define the preferred relationships before receiving a selected candidate relationship type and selected candidate target configuration item class from new relationship menu 608.

After selecting a candidate relationship type and a candidate target class, a user can select the "done" option in new relationship menu 608, which may cause the server device to pair the candidate relationship type with the candidate target class to obtain a preferred relationship for the particular configuration item class. However, in some instances a user may have specified an invalid relationship type. For example, a computing device class may not "run on" an application class, and so such a selection would not create a valid relationship. In such scenarios, the server device may prevent selection of the "done" option until a valid relationship is selected. When the relationship is validly selected and the "done" option is selected, the server device may further store the preferred relationship as relating to the particular class of configuration item in the CMDB.

After obtaining a preferred relationship from new relationship menu 608, the server device may display an updated representation of a set of preferred relationships for the particular configuration item class. An example of an updated display is provided in FIG. 6C.

Figure 6C:
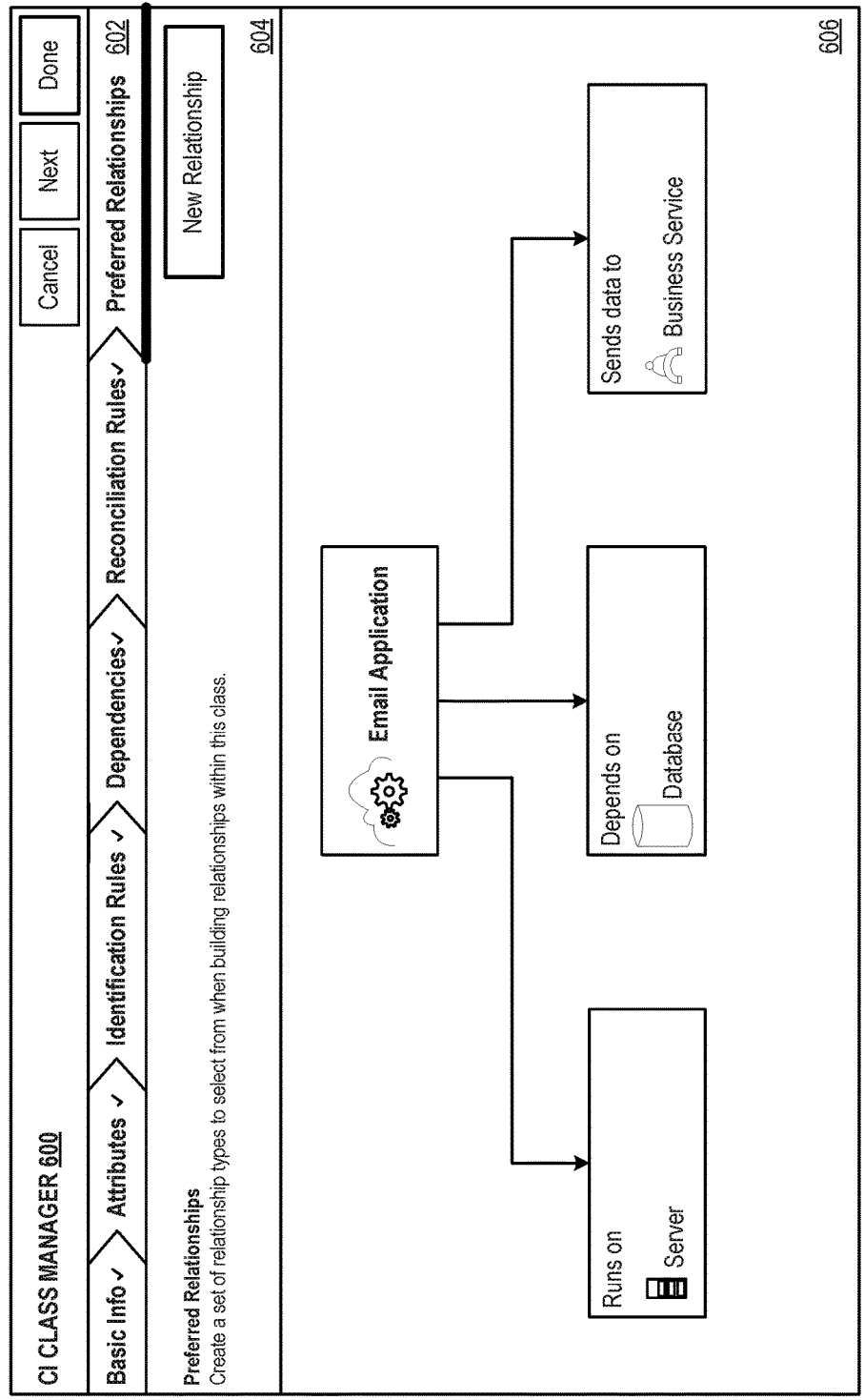

FIG. 6C depicts an updated relationships display 606. The updated relationship display is different from the one depicted in FIG. 6A, as a new preferred relationship has been added to the particular class. Specifically, in FIG. 6C, relationships display 606 includes an indication of a "sends data to" relationship between the "Email Application" class and the "Business Service" class.

Obtaining and storing the preferred relationships for the particular configuration item class may allow the remote network management platform to subsequently provide indications of the preferred relationships to a client device when new relationships are added to configuration items that are members of the particular class. Such visual indications are depicted in FIG. 7A.

Figure 7A:
FIGS. 7A and 7B depict another graphical user interface, in accordance with example embodiments.

FIG. 7A depicts a GUI 700, according to example embodiments. A user can navigate to the definition of a particular configuration item by way of GUI 700. Though not depicted in FIG. 7A, upon navigating to this definition, the user may select an option to set relationships for the particular configuration item. Upon selection of the option to set relationships for the particular configuration item, the server device may retrieve the stored plurality of relationships associated with the particular configuration item class of which the particular configuration item is a member, and provide preferred relationship selection display 702. In the present example, the particular configuration item is a mail user agent of the email application class, and preferred relationship selection display includes the set of preferred relationships described above with regard to FIGS. 6A, 6B, and 6C.

GUI 700 includes a preferred relationships selection display 702, which is operable to allow a user to select the preferred relationships defined for the class. Preferred relationships selection display 702 may include data entry fields (e.g. text boxes as shown in FIG. 7A) that correspond to each respective preferred relationship. Further, preferred relationship selection pane 702 may include options to adjust the preferred relationships, or, in some cases, to choose relationships that are not part of the set of preferred relationships.

In some examples, the particular configuration item may be a member of multiple configuration item classes. In such examples, GUI 700 may include an option to select from sets of preferred relationships that respectively correspond to the multiple classes. In the present example, only one such configuration item class is depicted.

Once the server device provides a visual indication of the preferred relationships by way of GUI 700, a user can select one or more of the preferred relationships. However, in some examples, a user can also adjust the preferred relationships, or use different relationships entirely. For example, preferred relationship selection display 702 includes a "view all valid representations for this CI" option, which may allow a user to select from other relationship types and target classes. In other examples, a user might only have the option to select from the preferred relationships, and may have no option to view other valid relationships. In still other examples, this option may be depend on permissions given to the user. For example, the server device may determine whether the client device is associated with a user who has been granted a privilege to select relationships other than those in the set of preferred relationships. Based on the determination, the server device may either permit, or prevent, the user from selecting other relationships.

In the present example, two preferred relationships have been selected. Selecting the "adjust" option for any preferred relationship may allow a user to change one or more of the relationship type and target configuration item class for a given preferred relationship. Selecting the "adjust" option may cause the server to provide, by way of GUI 700, a relationship adjustment menu 704, as depicted in FIG. 7B.

Figure 7B:
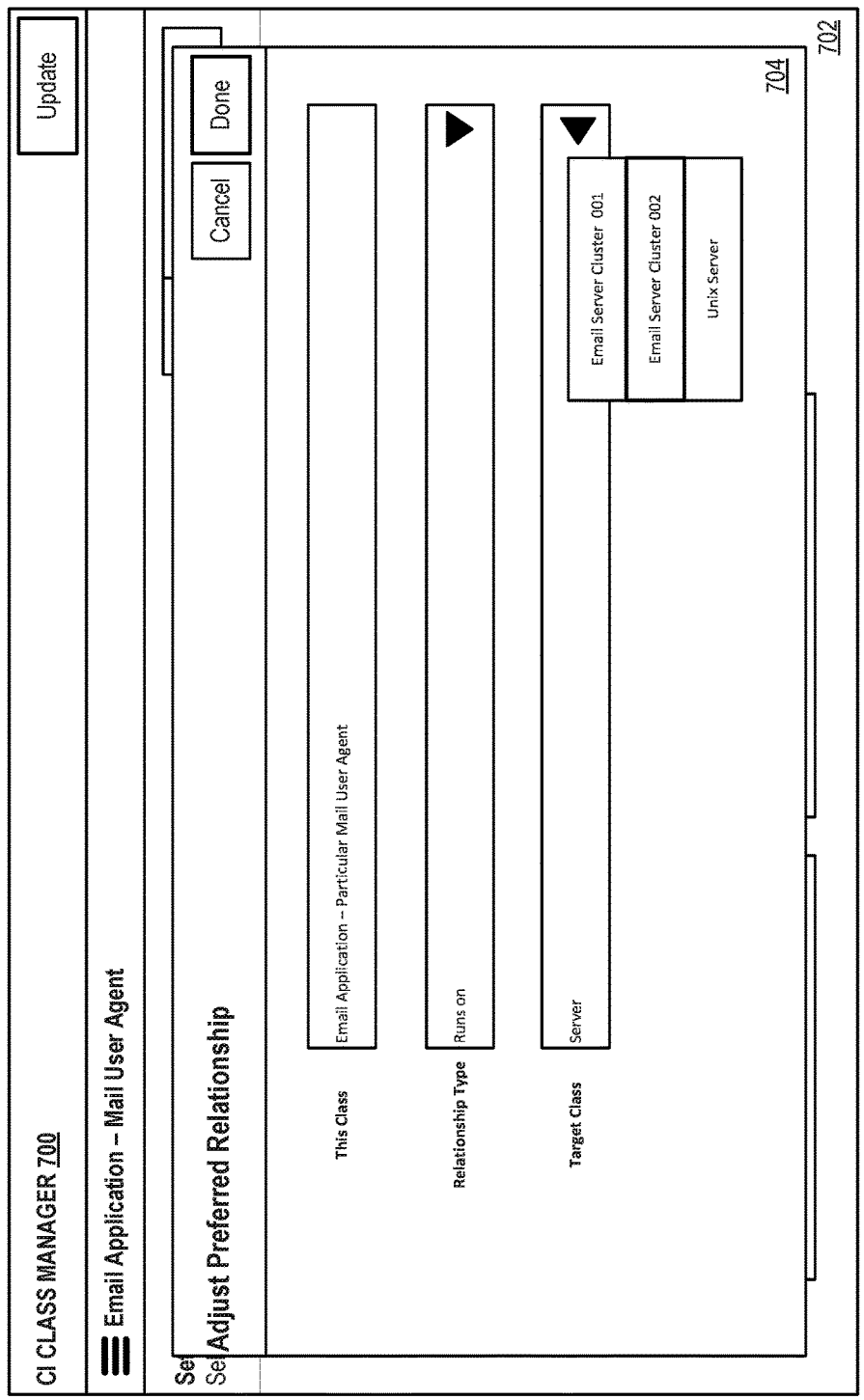

FIG. 7B depicts a relationship adjustment menu 704 of GUI 700. Relationship adjustment menu 704 may allow a user to change one or more of the relationship type and the target class for the configuration item under review. However, similar to the limited selections described above with regard to FIG. 6B, relationship adjustment menu 704 may only allow for similar relationship types and target classes to be selected. For example, similar relationships may be formed into groupings, and selection of a relationship type may be restricted to relationships in the grouping. For instance, in the present example, the drop-down box corresponding to the relationship type may include options to adjust the "runs on" relationship to "uses" or "depends on," because these relationship types may be in the same grouping as the "runs on" type. Conversely, the "runs on" relationship might not be adjustable to be set as the "provides" or "defines resources for" relationship type, because those relationship types might not be in the same grouping as the "runs on" type. In other examples, relationship types might not be adjustable.

A drop-down box within relationship adjustment menu 704 that corresponds to the preferred target class might also be limited to candidate target classes that are similar to the preferred target class. For example, the drop-down box may only include subclasses of the preferred target class. A subclass may be a configuration item class that is defined by a set of attributes that includes attributes used to define another class, and that shares a parent-child relationship with the other class. In the present example, a dropdown menu is provided that includes an "email server cluster 001," an "email server cluster 002," and a "unix server." Other selectable options are possible as well. In the present example, the user has opted to select "email server cluster 002," which may more specifically describe the operational interactions of the particular mail user agent configuration item relative to the selected "runs on" relationship type.

Selection of the "done" option in relationship adjustment menu 704 may cause the server device to receive an adjusted pairing of relationship type and target configuration item class. After receiving the adjusted pairing, the server device may return to preferred relationship selection display 702.

Referring again to FIG. 7A, a user, having selected a set of relationships for the particular configuration item, may update the particular configuration item by selecting the "update" option in GUI 700, which may cause the server device to update a record of the particular configuration item in the CMDB to include the set of selected relationships.

Setting preferred relationships for a particular configuration item class, as depicted in FIGS. 6A, 6B, and 6C, in addition to allowing a user to properly set relationships for particular configuration items, as depicted in FIGS. 7A and 7B, may allow for a streamlined process for setting preferred relationships in subclasses. After setting the preferred relationships, a subclass of the particular configuration item class may be defined by a similar process described above with regard to FIG. 6A.

Figure 8A:
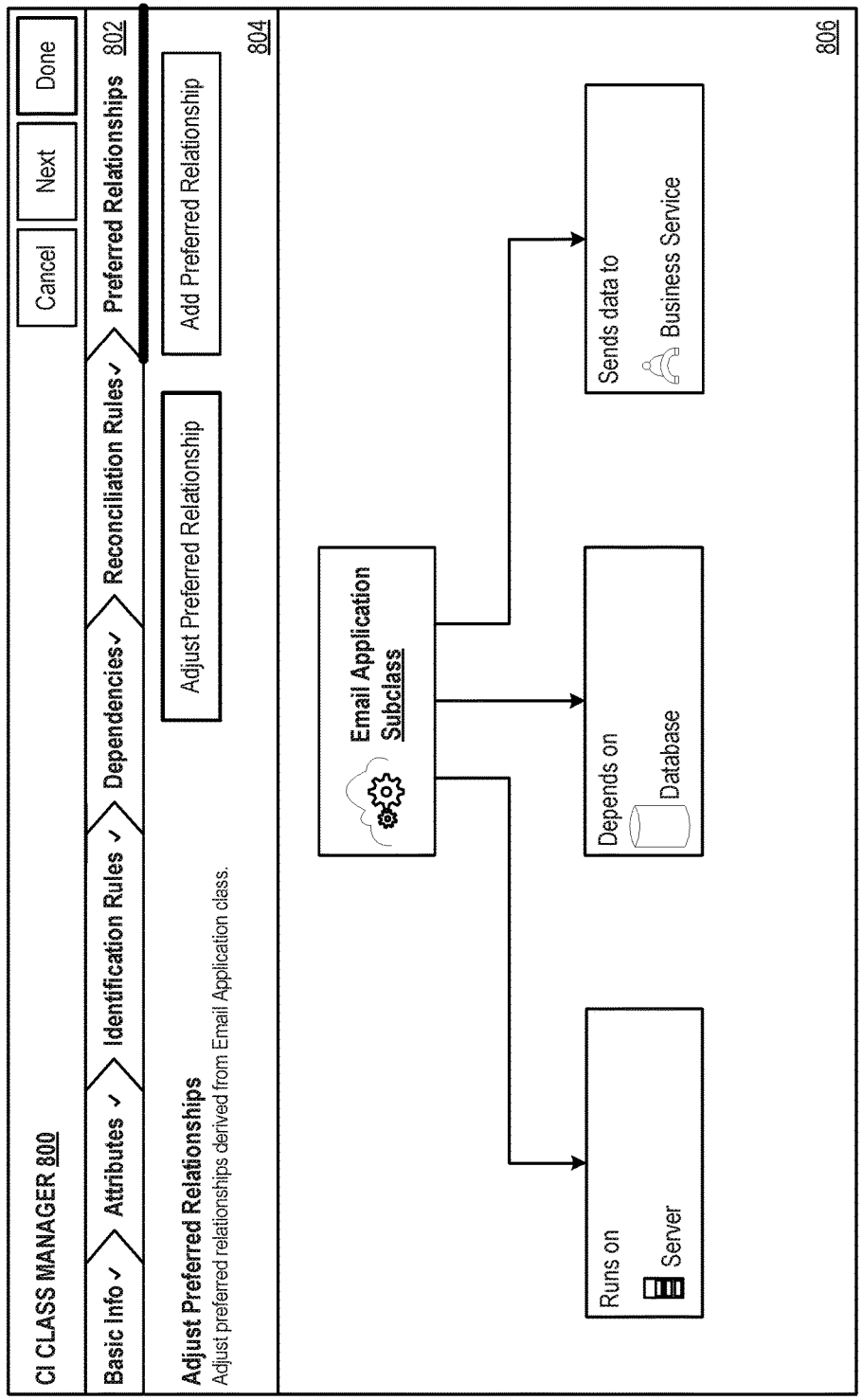
FIGS. 8A and 8B depict another graphical user interface, in accordance with example embodiments.

FIG. 8A depicts a GUI 800, according to example embodiments. GUI 800 shows a subclass of the particular configuration item class described above. GUI 800 includes preferred relationship pane 802, which in turn includes preferred relationship options 804 and preferred relationship selection display 806.

Preferred relationship options 804 include an "adjust preferred relationship" option, which a user to adjust an existing preferred relationship for the subclass, and an "add preferred relationship" option, which allows the user to create a new preferred relationship.

Preferred relationship selection display 806 shows that the subclass, labelled "Email Application Subclass" has inherited the preferred relationships for the particular configuration item class. A user may decide to alter or add preferred relationships based on operational characteristics of the subclass. For example, a user may alter the preferred relationships to specify subclasses of existing target classes in the preferred relationships so that the subclass is more accurately represented by the preferred relationships. The user can select the "adjust preferred relationship" option, which may cause the server device to provide, by way of GUI 800, a relationship adjustment menu 808, as depicted in FIG. 8B.

Figure 8B:
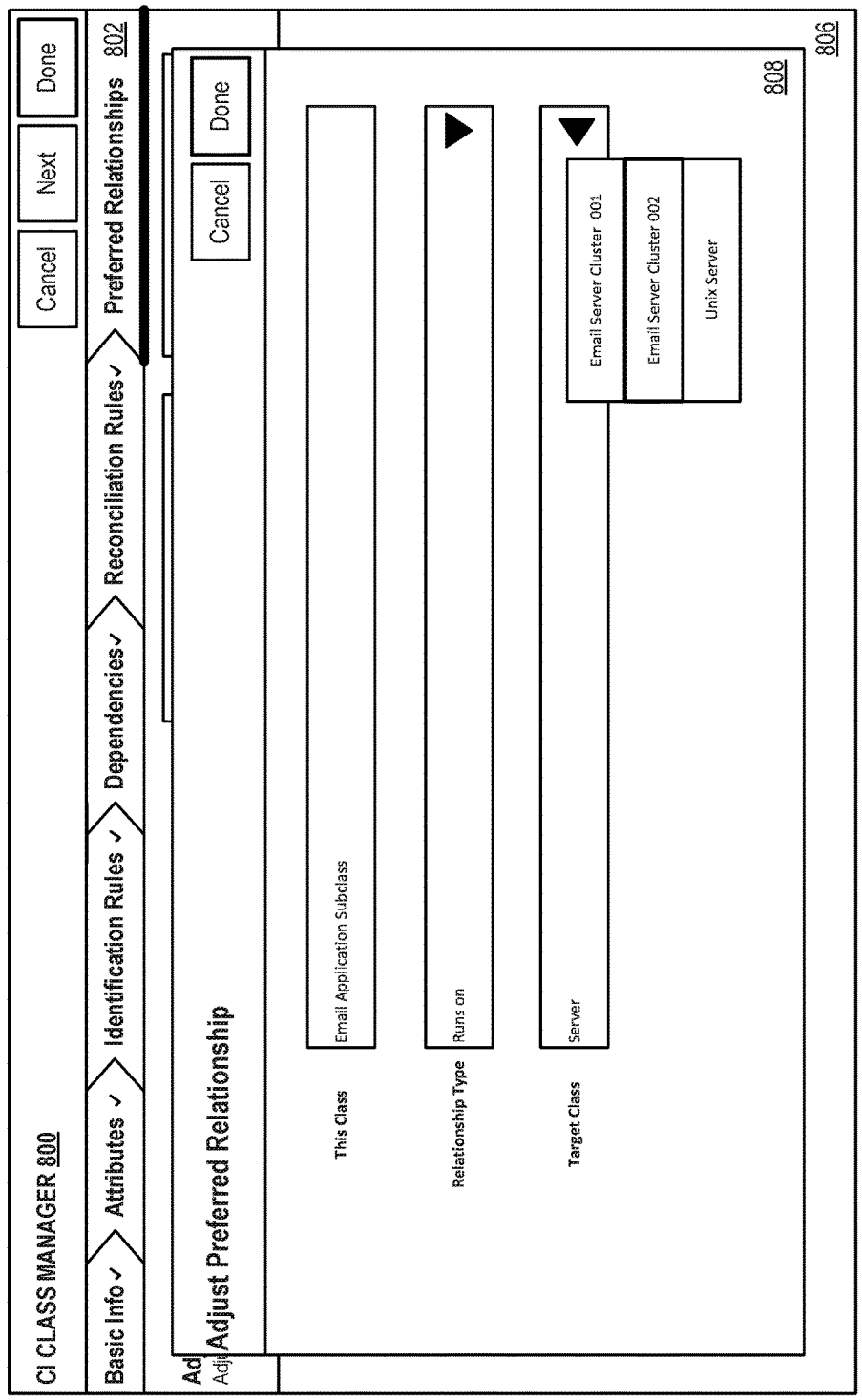

FIG. 8B depicts relationship adjustment menu 808, which may operate in substantially the same fashion described with regard to relationship adjustment menu 704 described above with regard to FIG. 7B. That is, relationship adjustment module 808 may include a first drop-down box that corresponds to a candidate relationship type for the preferred relationship and a second drop-down box that corresponds to a candidate relationship type for the preferred target class. Options to select a candidate relationship type or a candidate target configuration item class from either drop-down box may be limited based on the subclass and operational characteristics thereof as described above with regard to the particular configuration item class in FIG. 6B. That is, selection of a candidate relationship type and target configuration item class may be based on whether the selected relationship type and selected target class form a valid relationship with the subclass of the particular configuration item class.

Selections for relationship adjustment menu 808 may also be restricted in the same ways described above with regard to FIG. 7B. Specifically, selection options for a candidate relationship type may be limited based on a candidate target configuration item class, and selection of a candidate target configuration item class can likewise be limited based on a candidate relationship type.

Access to relationship adjustment menu 808 may also be restricted based on whether or not a client device interacting with GUI 800 is associated with a user who has been granted a privilege to define the preferred relationships for the subclass.

Selection of the "done" option in relationship adjustment menu 808 may cause the server device to receive an adjusted pairing of relationship type and target configuration item class for the subclass. After receiving the adjusted pairing, the server device may return to preferred relationship selection display 806. Accordingly, the server device can obtain a plurality of preferred relationships before the user selects the "done" option in GUI 800, which causes the server device to store, in the CMDB, the plurality of preferred relationships as being associated with the subclass of the particular configuration item class.

As described above, having multiple sources that can adjust relationships between configuration items in a managed network may cause redundant, inaccurate, or conflicting relationships to be stored in the CMDB. In addition to wasting space in the CMDB, these relationships might inaccurately represent the operational characteristics of the managed network. Setting preferred relationships for configuration item classes alleviates these problems by ensuring consistently defined relationships for configuration items in the classes. Additionally, enforcing such preferred relationships by restricting selection options or requiring privileged access to preferred relationships can mitigate any negative effects from inexperienced users in the managed network.

Also, workflows and orchestrations that rely on relationships between configuration items and configuration item classes being correctly defined are more likely to operate properly.

VI. EXAMPLE OPERATIONS

Figure 9:
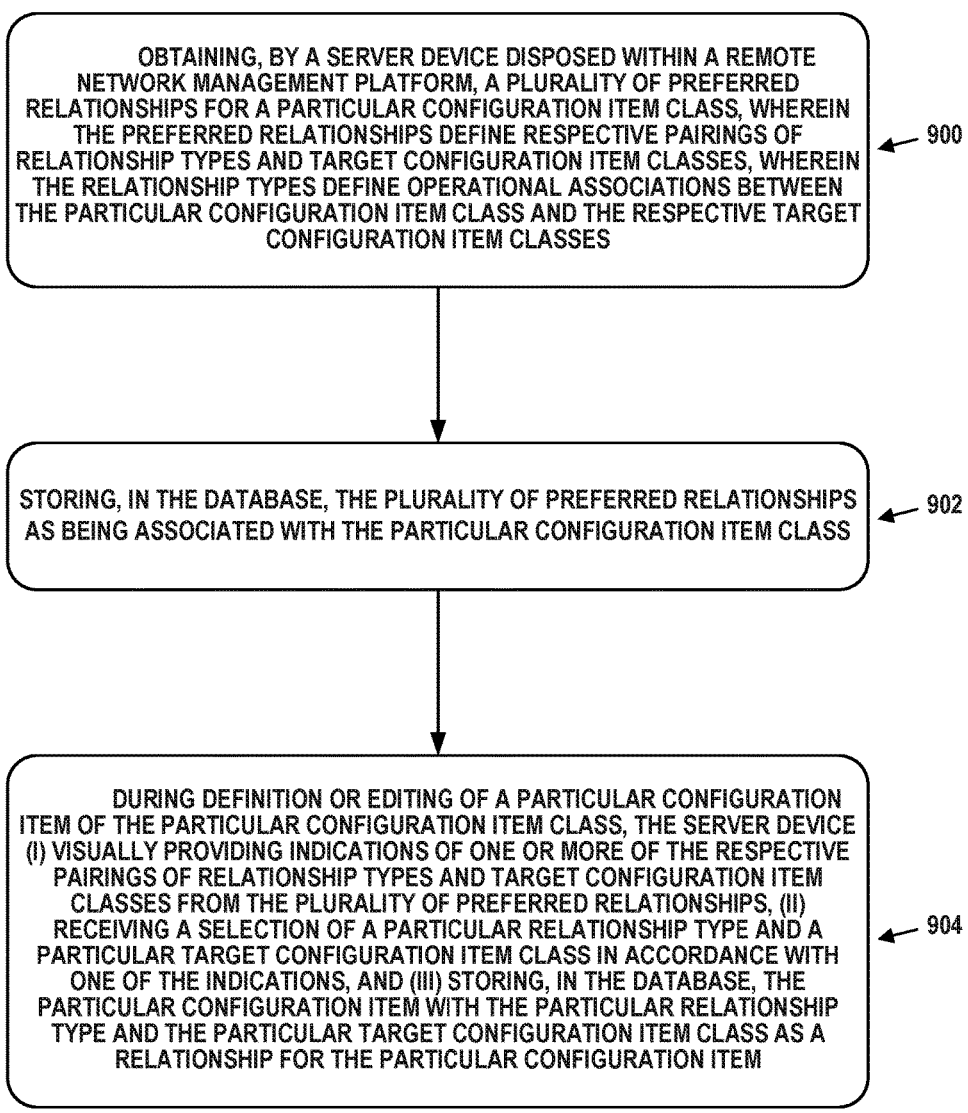
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

A database disposed within a remote network management platform may contain representations of configuration items associated with a managed network that is managed by the remote network management platform. The configuration items may relate to computing devices and software applications disposed within the managed network. Each configuration item may be a member of a configuration item class, and configuration item classes include respective sets of configuration items that share common attributes.

Block 900 may involve obtaining, by a server device disposed within a remote network management platform, a plurality of preferred relationships for a particular configuration item class. The preferred relationships may define respective pairings of relationship types and target configuration item classes. The relationship types may define operational associations between the particular configuration item class and the respective target configuration item classes.

Block 902 may involve storing, in the database, the plurality of preferred relationships as being associated with the particular configuration item class.

Block 904 may involve, during definition or editing of a particular configuration item of the particular configuration item class, (i) visually providing, by the server device, indications of one or more of the respective pairings of relationship types and target configuration item classes from the plurality of preferred relationships, (ii) receiving, by the server device, a selection of a particular relationship type and a particular target configuration item class in accordance with one of the indications, and (iii) storing, by the server device in the database, the particular configuration item with the particular relationship type and the particular target configuration item class as a relationship for the particular configuration item.

In an embodiment, the plurality of preferred relationships for the particular configuration item class may include, during or after definition of the particular configuration item class, transmitting, to a client device, a representation of a graphical user interface that allows selection of a candidate relationship type and a candidate target configuration item class for pairing, receiving, from the client device and by way of the graphical user interface, selection of the candidate relationship type and the candidate target configuration item class, and pairing the candidate relationship type and the candidate target configuration item class as a preferred relationship of the particular configuration item class.

In an embodiment, the graphical user interface allowing selection of the candidate relationship type and the candidate target configuration item class for pairing may include displaying the candidate relationship type and the candidate target configuration item class in respective drop-down boxes. Candidate relationship types available for selection by way of the graphical user interface may be limited based on the particular configuration item class. Candidate target configuration item classes available for selection by way of the graphical user interface may be further limited based on the particular configuration item class. Further, candidate target configuration item classes available for selection by way of the graphical user interface may be limited based on the particular configuration item class. Additionally, selection of the candidate relationship type and the candidate target configuration item class for pairing may be permitted only when the client device is associated with a user who has been granted a privilege to define the preferred relationships.

In an embodiment, one or more subclasses of the particular configuration item class may inherit the preferred relationships for the particular configuration item class.

In an embodiment, visually providing the indications of one or more of the respective pairings of relationship types and target configuration item classes from the plurality of preferred relationships may include transmitting, to a client device, a representation of a graphical user interface that includes the indications of one or more of the respective pairings of relationship types and target configuration item classes in respectively associated drop-down boxes.

In an embodiment, visually providing the indications of one or more of the respective pairings of relationship types and target configuration item classes from the plurality of preferred relationships may include transmitting, to a client device, a representation of a graphical user interface that includes the indications of one or more of the respective pairings of relationship types and target configuration item classes, and preventing, by way of the graphical user interface, the client device from selecting of any pairing of relationship type and target configuration item class that is not in the plurality of preferred relationships.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A remote network management platform comprising:
a database containing representations of configuration items associated with a managed network that is managed by the remote network management platform, wherein the configuration items relate to computing devices and software applications disposed within the managed network, wherein each configuration item is a member of a configuration item class, and wherein configuration item classes include respective sets of configuration items that share common attributes; and a server device configured to:

obtain a plurality of preferred relationships for a particular configuration item class, wherein the preferred relationships define respective pairings of relationship types and target configuration item classes, wherein the relationship types define operational associations between the particular configuration item class and the respective target configuration item classes, store, in the database, the plurality of preferred relationships as being associated with the particular configuration item class, and during definition or editing of a particular configuration item of the particular configuration item class, (i) cause indications of one or more of the respective pairings of relationship types and target configuration item classes from the plurality of preferred relationships to be visually provided, (ii) receive a selection of a particular relationship type and a particular target configuration item class in accordance with one of the indications, and (iii) store, in the database, the particular configuration item with the particular relationship type and the particular target configuration item class as a relationship for the particular configuration item, wherein causing the indications of one or more of the respective pairings of relationship types and target configuration item classes from the plurality of preferred relationships to be visually provided comprises:

transmitting, to a client device, a representation of a graphical user interface that includes the indications of one or more of the respective pairings of relationship types and target configuration item classes; and preventing, by way of the graphical user interface, the client device from selecting of any pairing of relationship type and target configuration item class that is not in the plurality of preferred relationships.

2. The remote network management platform of claim 1, wherein obtaining the plurality of preferred relationships for the particular configuration item class comprises:

during or after definition of the particular configuration item class, transmitting, to a client device, a representation of a graphical user interface that allows selection of a candidate relationship type and a candidate target configuration item class for pairing;

receiving, from the client device and by way of the graphical user interface, selection of the candidate relationship type and the candidate target configuration item class; and pairing the candidate relationship type and the candidate target configuration item class as a preferred relationship of the particular configuration item class.

3. The remote network management platform of claim 2, wherein the graphical user interface that allows the selection of the candidate relationship type and the candidate target configuration item class for pairing allows the candidate relationship type and the candidate target configuration item class to be displayed in respective drop-down boxes.

4. The remote network management platform of claim 2, wherein candidate relationship types available for selection by way of the graphical user interface are limited based on the particular configuration item class.

5. The remote network management platform of claim 4, wherein candidate relationship types available for selection by way of the graphical user interface are limited based on the candidate target configuration item class.

6. The remote network management platform of claim 2, wherein candidate target configuration item classes available for selection by way of the graphical user interface are limited based on the particular configuration item class.

7. The remote network management platform of claim 2, wherein selection of the candidate relationship type and the candidate target configuration item class for pairing is permitted only when the client device is associated with a user who has been granted a privilege to define the preferred relationships.

8. The remote network management platform of claim 1, wherein one or more subclasses of the particular configuration item class inherit the preferred relationships for the particular configuration item class.

9. The remote network management platform of claim 1, wherein causing the indications of one or more of the respective pairings of relationship types and target configuration item classes from the plurality of preferred relationships to be visually provided comprises:

transmitting, to a client device, a representation of a graphical user interface that includes the indications of one or more of the respective pairings of relationship types and target configuration item classes in respectively associated drop-down boxes.

10. A computer-implemented method, wherein a database disposed within a remote network management platform contains representations of configuration items associated with a managed network that is managed by the remote network management platform, wherein the configuration items relate to computing devices and software applications disposed within the managed network, wherein each configuration item is a member of a configuration item class, and wherein configuration item classes include respective sets of configuration items that share common attributes, the method comprising:

obtaining, by a server device disposed within a remote network management platform, a plurality of preferred relationships for a particular configuration item class, wherein the preferred relationships define respective pairings of relationship types and target configuration item classes, wherein the relationship types define operational associations between the particular configuration item class and the respective target configuration item classes;

storing, in the database, the plurality of preferred relationships as being associated with the particular configuration item class; and during definition or editing of a particular configuration item of the particular configuration item class, the server device (i) causing indications of one or more of the respective pairings of relationship types and target configuration item classes from the plurality of preferred relationships to be visually provided, (ii) receiving a selection of a particular relationship type and a particular target configuration item class in accordance with one of the indications, and (iii) storing, in the database, the particular configuration item with the particular relationship type and the particular target configuration item class as a relationship for the particular configuration item, wherein causing the indications of one or more of the respective pairings of relationship types and target configuration item classes from the plurality of preferred relationships to be visually provided comprises:

transmitting, to a client device, a representation of a graphical user interface that includes the indications of one or more of the respective pairings of relationship types and target configuration item classes; and preventing, by way of the graphical user interface, the client device from selecting of any pairing of relationship type and target configuration item class that is not in the plurality of preferred relationships.

11. The computer-implemented method of claim 10, wherein obtaining the plurality of preferred relationships for the particular configuration item class comprises:

during or after definition of the particular configuration item class, transmitting, to a client device, a representation of a graphical user interface that allows selection of a candidate relationship type and a candidate target configuration item class for pairing;

receiving, from the client device and by way of the graphical user interface, selection of the candidate relationship type and the candidate target configuration item class; and pairing the candidate relationship type and the candidate target configuration item class as a preferred relationship of the particular configuration item class.

12. The computer-implemented method of claim 11, wherein transmitting the graphical user interface that allows the selection of the candidate relationship type and the candidate target configuration item class for pairing allows the candidate relationship type and the candidate target configuration item class to be displayed in respective drop-down boxes.

13. The computer-implemented method of claim 11, wherein candidate relationship types available for selection by way of the graphical user interface are limited based on the particular configuration item class.

14. The computer-implemented method of claim 11, wherein candidate target configuration item classes available for selection by way of the graphical user interface are limited based on the particular configuration item class.

15. The computer-implemented method of claim 11, wherein selection of the candidate relationship type and the candidate target configuration item class for pairing is permitted only when the client device is associated with a user who has been granted a privilege to define the preferred relationships.

16. The computer-implemented method of claim 10, wherein one or more subclasses of the particular configuration item class inherit the preferred relationships for the particular configuration item class.

17. The computer-implemented method of claim 10, wherein causing the indications of one or more of the respective pairings of relationship types and target configuration item classes from the plurality of preferred relationships to be visually provided comprises:

transmitting, to a client device, a representation of a graphical user interface that includes the indications of one or more of the respective pairings of relationship types and target configuration item classes in respectively associated drop-down boxes.

18. A non-transitory, tangible, computer-readable medium, wherein a database disposed within a remote network management platform contains representations of configuration items associated with a managed network that is managed by the remote network management platform, wherein the configuration items relate to computing devices and software applications disposed within the managed network, wherein each configuration item is a member of a configuration item class, and wherein configuration item classes include respective sets of configuration items that share common attributes, and wherein the non-transitory, tangible, computer-readable medium has stored thereon program instructions that, upon execution by a server device disposed within the remote network management platform, cause the server device to perform operations comprising:

obtaining a plurality of preferred relationships for a particular configuration item class, wherein the preferred relationships define respective pairings of relationship types and target configuration item classes, wherein the relationship types define operational associations between the particular configuration item class and the respective target configuration item classes;

storing, in the database, the plurality of preferred relationships as being associated with the particular configuration item class; and during definition or editing of a particular configuration item of the particular configuration item class, (i) causing indications of one or more of the respective pairings of relationship types and target configuration item classes from the plurality of preferred relationships to be visually provided, (ii) receiving a selection of a particular relationship type and a particular target configuration item class in accordance with one of the indications, and (iii) storing, in the database, the particular configuration item with the particular relationship type and the particular target configuration item class as a relationship for the particular configuration item, wherein causing the indications of one or more of the respective pairings of relationship types and target configuration item classes from the plurality of preferred relationships to be visually provided comprises:

transmitting, to a client device, a representation of a graphical user interface that includes the indications of one or more of the respective pairings of relationship types and target configuration item classes; and preventing, by way of the graphical user interface, the client device from selecting of any pairing of relationship type and target configuration item class that is not in the plurality of preferred relationships.

19. The non-transitory, tangible, computer-readable medium of claim 18, wherein the program instructions that, upon execution by a server device disposed within the remote network management platform, cause the server device to obtain the plurality of preferred relationships for the particular configuration item class comprises program instructions that, upon execution by a server device disposed within the remote network management platform, cause the server device to:

during or after definition of the particular configuration item class, transmit, to a client device, a representation of a graphical user interface that allows selection of a candidate relationship type and a candidate target configuration item class for pairing;

receive, from the client device and by way of the graphical user interface, selection of the candidate relationship type and the candidate target configuration item class; and pair the candidate relationship type and the candidate target configuration item class as a relationship for the particular configuration item.

20. The non-transitory, tangible, computer-readable medium of claim 19, wherein candidate relationship types available for selection by way of the graphical user interface are limited based on the particular configuration item class.

* * * * *